(12) United States Patent
Huntley et al.

(10) Patent No.: US 6,208,416 B1
(45) Date of Patent: Mar. 27, 2001

(54) METHOD AND APPARATUS FOR MEASURING SHAPE OF OBJECTS

(75) Inventors: Jonathan Mark Huntley, Loughborough (GB); Henrik Saldner, Jonkoping (SE)

(73) Assignee: Loughborough University Innovations Limited (GB)

( * ) Notice: Subject to any disclaimer, the term of this patent is extended or adjusted under 35 U.S.C. 154(b) by 0 days.

(21) Appl. No.: 09/142,707

(22) PCT Filed: Mar. 20, 1997

(86) PCT No.: PCT/GB97/00771

§ 371 Date: Mar. 10, 1999

§ 102(e) Date: Mar. 10, 1999

(87) PCT Pub. No.: WO97/36144

PCT Pub. Date: Oct. 2, 1997

(30) Foreign Application Priority Data

Mar. 22, 1996 (GB) .................................................. 9606127
Mar. 26, 1996 (GB) .................................................. 9606330
Dec. 21, 1996 (GB) .................................................. 9626632

(51) Int. Cl.$^7$ ...................................................... G01B 9/02
(52) U.S. Cl. ........................................... 356/374; 356/512
(58) Field of Search ................................. 356/374, 512, 356/511

(56) References Cited

U.S. PATENT DOCUMENTS 5,321,497    6/1994    Ai et al. .

OTHER PUBLICATIONS

Database Inspec.—Institute of Electrical Engineers, Stevenage, GB, Inspec No. 5556642, Feb. 1997—Saldner H.O. et al: "Profilometry using temporal phase unwrapping and a spatial light modulator–based fringe projector", XP002033884, see abstract, & Optical Engineering, Feb. 1997, SPIE, USA, vol. 36, mo. 2, ISSN 0091–3286, pp. 610–615.

(List continued on next page.)

*Primary Examiner*—Robert Kim
*Assistant Examiner*—Andrew H. Lee
(74) *Attorney, Agent, or Firm*—Renner, Otto, Boisselle & Sklar, LLP

(57) ABSTRACT

There is disclosed a method for measuring the shape of objects which might have surface discontinuities using projected fringes, in which method the pitch of the fringes is varied over time and a sequence of phase-stepped images is recorded from which a three-dimensional complex intensity is calculated and either the phase of the distribution is unwrapped along the time axis or the Fourier transform of the distribution is calculated along the time axis.

24 Claims, 7 Drawing Sheets

OTHER PUBLICATIONS

Database Inspec—Institute of Electrical Engineers, Stevenage, GB, Inspec. No. 5088483, Burton D.R. et al: "The use of carrier frequency shifting for the elimination of phase discontinuities in Fourier transform profilometry", XP002033870, see abstract, & Optics and Lasers in Engineering, 1995, UK, vol. 23, No. 4, ISSN 0143–8166, pp. 245–257.

Applied Optics, vol. 33, No. 14, May 10, 1994, pp. 2939–2948, XP000442254, Burton D.R. et al: "Multichannel Fourier Fringe Analysis as an Aid to Automatic Phase Unwrapping" (see the whole document).

Applied Optics, vol. 34, No. 14, May 10, 1995, pp. 2560–2563, XP000511454, Quiroga J.A. et al: "Phase–Unwrapping Algorithm Based on an Adaptive Criterion" (see the whole document).

Database Inspec—Institute of Electrical Engineers, Stevenage, GB, Inspec. No. 5592018, Saldner H.O. et al: "Shape measurement of discontinuous objects using projected fringes and temporal phase unwrapping", XP002033877, see abstract, & Proceedings, International Conference on Recent Advances in 3–D Digital Imaging and Modeling (Cat. No. 97TB100134), Proceedings, International Conference on Recent Advances in 3–D Digital Imaging and Modeling (Cat. No. 97TB100134), Ottawa, Ont. Canada, ISBN 0–8186–7943–3, 1997, Los Alamitos, CA, USA, IEEE Comput. Soc. Press, USA, pp. 44–50.

METHOD AND APPARATUS FOR MEASURING SHAPE OF OBJECTS

This invention relates to measuring the shape of objects.

The use of projected fringes for measurement of surface profile is a well-developed technique as described for example by V. Srinivasan, H. C. Liu and M. Halioua, "Automated phase-measuring profilometry of 3-D diffuse objects," Appl. Opt. 23 3105–3108 (1984). Parallel fringes are projected onto the object surface, either by a conventional imaging system or by coherent light interference patterns. If the projection and observation directions are different, the phase distribution of the measured fringe pattern includes information on the surface height profile of the object. The sensitivity can be improved by viewing through a line grating: the technique is then referred to as projection moiré.

Automated analysis of the fringe patterns is normally carried out either by the Fourier transform method (M Takeda, H Ina and S Kobayashi, "Fourier-transform method of fringe-pattern analysis for computer-based topography and interferometry", J Opt. Soc. Am 72 156–160 (1982)), or by phase-stepping of the fringe patterns (J. H. Bruning, D. R. Herriott, J. E. Gallagher, D. P. Rosenfeld, A. D. White and D. J. Brangaccio, "Digital wavefront measuring interferometer for testing optical surfaces and lenses", Appl. Opt. 13 2693–2703 (1974)). Both produce wrapped phase maps (i.e., phase values lying in the range $-\pi$ to $+\pi$); the $2\pi$ phase jumps must then be removed by the process known as phase unwrapping to recover the surface shape. Phase unwrapping is normally carried out by comparing the phase at neighbouring pixels and adding or subtracting multiples of $2\pi$ to bring the relative phase between the two pixels into the range $-\pi$ to $+\pi$. This causes problems when the technique is applied to real engineering objects since such objects often contain sudden jumps in profile. It can then become impossible to unwrap correctly across such real discontinuities and large (multiples of $2\pi$) phase errors can propagate across the image. The problem can be reduced in principle by measuring several phase maps at different sensitivities. Only one unwrapped map will then be consistent with all the wrapped maps. White light interferometry can also measure absolute surface heights, but is difficult to apply when the height variations exceed the range of piezo-electric translators (PZT), typically a fraction of a mm.

The present invention provides methods and apparatus which can rapidly and unambiguously measure the profiles of discontinuous objects.

The invention comprises a method for measuring the shape of objects which might have surface discontinuities using projected fringes, in which the pitch of the fringes is varied over time. Each time the fringe pitch is changed a sequence of phase-stepped images of the fringe pattern is recorded, from which a complex intensity map is calculated. The sequence of such maps forms a three-dimensional complex intensity distribution. The phase of this distribution is then unwrapped along the time axis or else the Fourier transform along the time axis is calculated to yield data representative of the shape of the surface.

Intensity maps may be recorded as pixel images.

The pitch of the fringes may be varied by piezo-electric device means.

The fringes may be produced by Michelson interferometer means, and the phase and spatial frequency of the fringes may then be varied by plane mirrors forming part of the interferometer means.

The fringes may, however, be generated by interference between laser light traversing dissimilar paths of which at least one is variable for changing phase and spatial frequency.

The fringes may also be generated from incoherent light by a spatial light modulator (SLM) which can be operated to change the phase and spatial frequency of the fringes.

The invention also comprises apparatus for measuring shape of objects which might have surface discontinuities using projected fringes comprising fringe generating means projecting fringes on the object to be measured, phase stepping means to vary the phase of the fringes and fringe pitch varying means adapted to vary the pitch of the generated fringes over time, recording means adapted to record the sequence of phase-stepped images as the fringe pitch is varied over time and computing means programmed to calculate a three-dimensional complex intensity distribution either to unwrap the phase of this distribution along the time axis or to calculate its Fourier transform along the time axis to yield data representative of the shape of the surface.

The change in the fringe pitch between any two successive phase maps must be sufficiently small that the resulting unwrapped phase change lies in the range $-\pi$ to $+\pi$ for all points within the measurement region. This is equivalent to the requirement that, provided the position of the central fringe remains unchanged during the changing of the fringe pitch, no more than one fringe is added to the projected fringe pattern between the acquisition of two successive phase maps. The requirement may however be relaxed in certain circumstances.

The fringe generating means may comprise Michelson interferometer means in which the fringe phase and pitch varying means comprise plane mirror means. The interferometer means may comprise a beamsplitter cube with orthogonal adjacent faces and adjustable mirrors in juxta-position to said adjacent faces of which one mirror may be adjustable towards and away from its associated face (for phase changing) and the other adjustable as to tilt (for spatial frequency changing). Alternatively the tilt and translation operations may be combined into a single mirror mount. At least one mirror may be adjustable by means of a piezo-electric device.

The fringe generating means may comprise laser illuminated optical fibre means providing two dissimilar light paths. The phase varying means may comprise optical fibre length varying means, which may comprise a piezo-electric cylinder around which the fibre is wrapped and which is electrically actuated to vary its diameter. A second piezo-electric device can relatively shift adjacent light output ends of the optical fibres to change the fringe spatial frequency.

The fringe generating means may comprise an incoherent, white light source and a spatial light modulator driven by an external signal source so as to produce synthetic fringes such that the transmitted light intensity has an approximately sinusoidal profile. The arrangement may comprise a condenser lens system and a projection lens projecting the fringes onto the object to be measured.

The transmittance of the spatial light modulator may be wavelength-dependent thereby allowing several fringe patterns of differing phase or spatial frequency to be projected simultaneously as patterns of differing colour within a single projected image.

The recording means may comprise a pixel image recorder such as a video system in which the object is imaged by a lens on to the light-sensitive image detector. The sensitivity of the image detector may be wavelength-dependent thereby allowing several fringe patterns of differing phase or spatial frequency to be recorded as a single coloured image.

The computing means may comprise a processor arranged to operate in real time by carrying out simple arithmetic operations on an entire pixel image fame simultaneously. Parallel processors or a fast serial processor could be used. It is of course not always required to operate in real time. The processor may have sufficient random access memory to store the entire three-dimensional complex intensity distribution so that the one-dimensional Fourier transform can be calculated along the time axis.

Methods and apparatus for measuring the shape of objects which might have discontinuities using projected fringes in accordance with the invention will now be described with reference to the accompanying drawings, in which.

Figure 7:
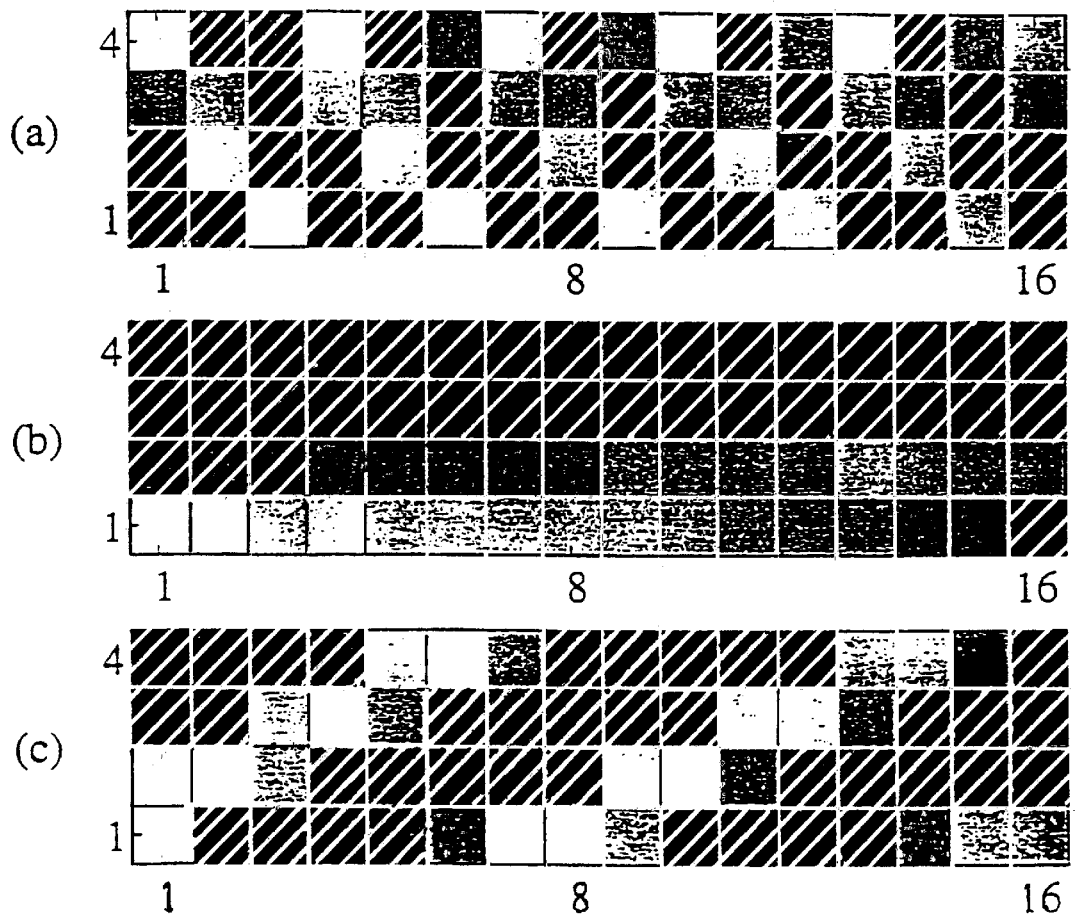
FIG. 7 is a representation of the measured intensity at three pixels (a), (b) and (c) as a function of phase shift index (p:vertical axis) and time (t:horizontal axis) in the measurement volume of FIG. 6.
Figure 9:
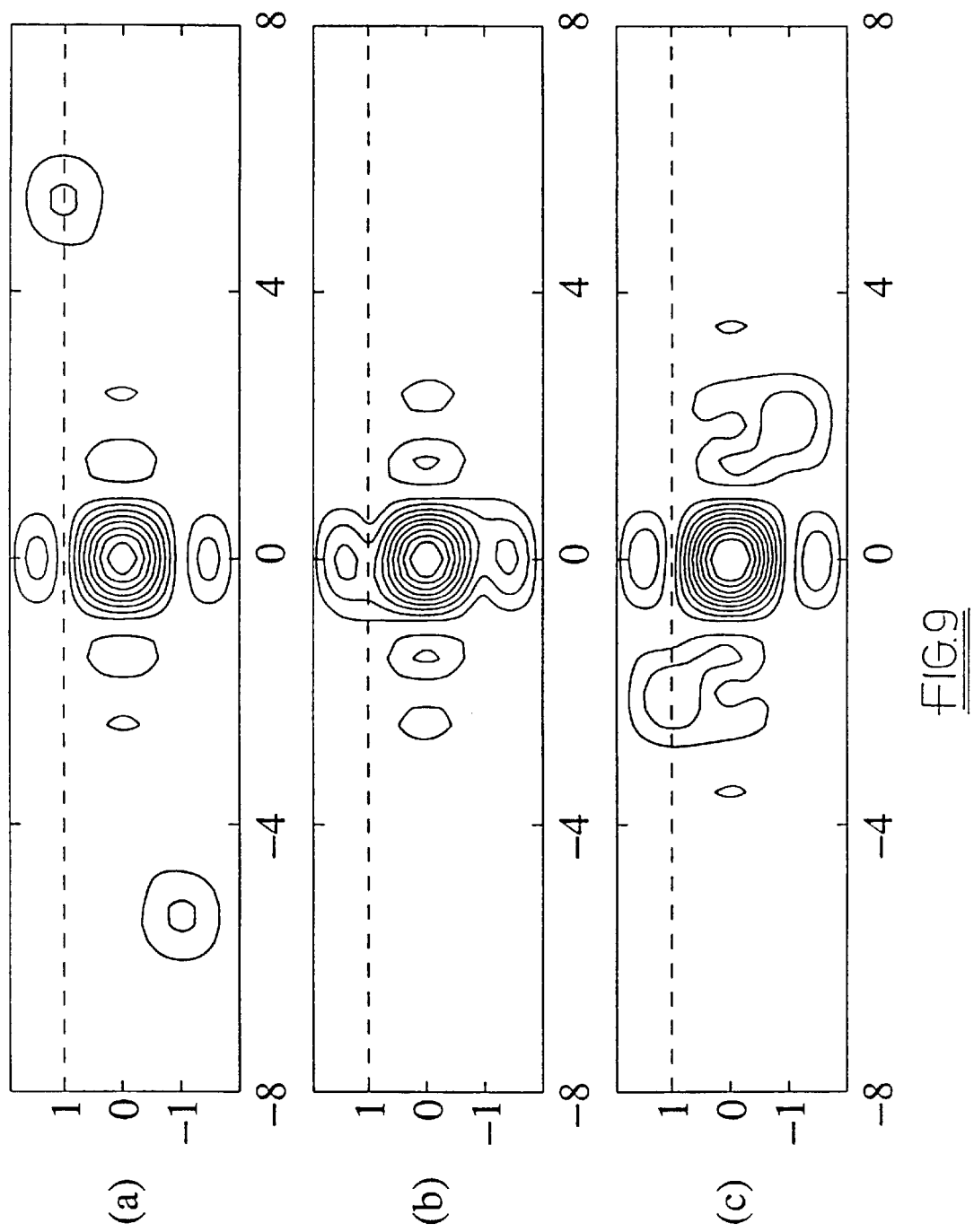
Figure 10:
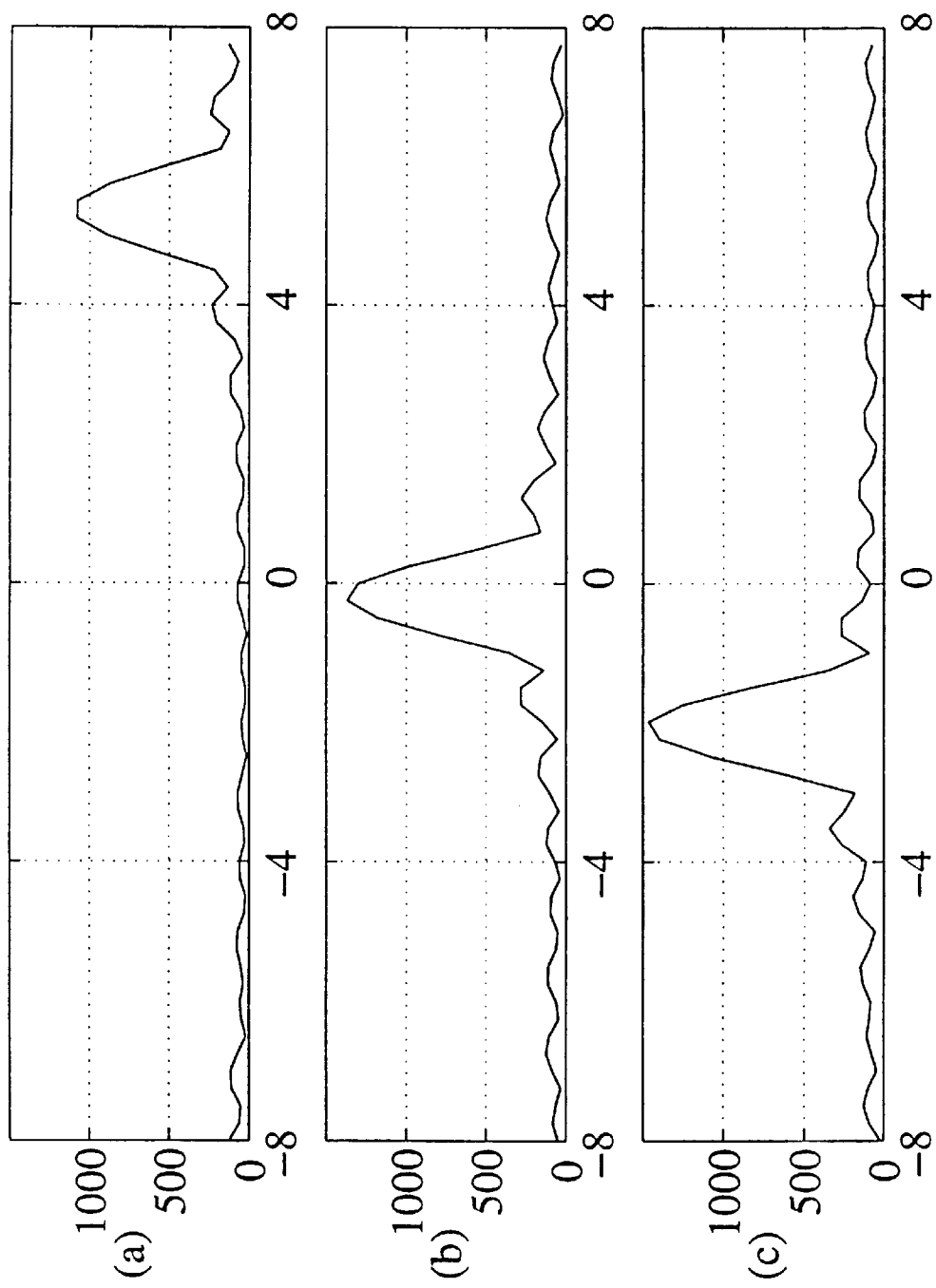

FIG. 9 comprises contour maps of the 2-D Fourier transforms of the intensity distributions for the three pixels shown in FIG. 7, the horizontal and vertical axes being $k_t$ and $k_p$, representing spatial frequencies along the time (t) and phase shift index (p) axes; and FIG. 10 shows cross-sections of the contour maps of FIG. 9 along the line $k_p=1-$ the vertical axis being 500 arbitrary units corresponding to the contour interval in FIG. 9.

Figure 1:
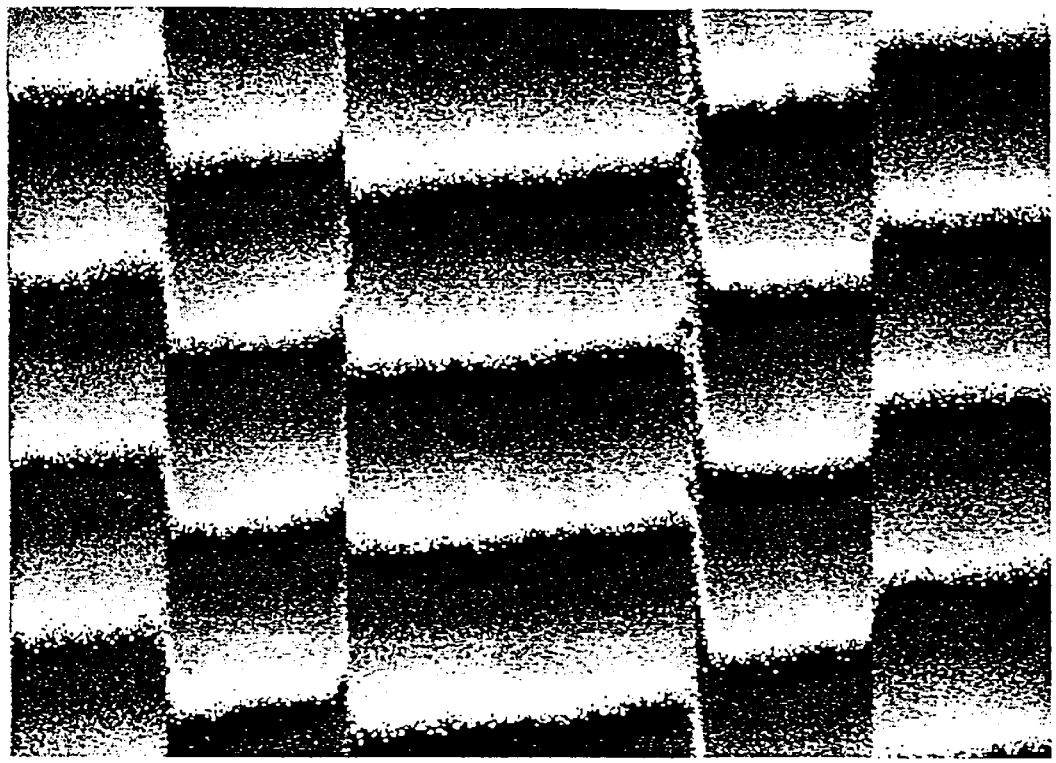
FIG. 1 is a wrapped phase map of an object (grey shades ranging from black to white represent phase values ranging from $-\pi$ to $+\pi$.

FIG. 1 is a typical wrapped phase map such as would be obtained by conventional projected fringe measurement of a test object consisting of three 4 mm wide vertical grooves on 6 mm centres machined in a flat piece of plastic. The edges of the first and third grooves are visible on the left and right sides of the image. The depths of the three grooves are approximately 1 mm, 2 mm and 4 mm. It is impossible to unwrap this phase map correctly by conventional spatial methods since the phase jumps at the groove edges fall outside the range ($-\pi$, $+\pi$). The relative depths of the grooves are therefore uncertain to integral multiples of $2\pi$. The test object was illuminated along the grooves to avoid shadowing.

The problem is resolved by applying the technique of temporal phase unwrapping (J M Huntley and H O Saldner, Temporal phase-unwrapping algorithm for automated interferogram analysis, Appl. Opt. 32, 3047–3052 (1993)). However, ways must be provided to vary both phase and spatial frequency or pitch of the fringes.

Figure 3:
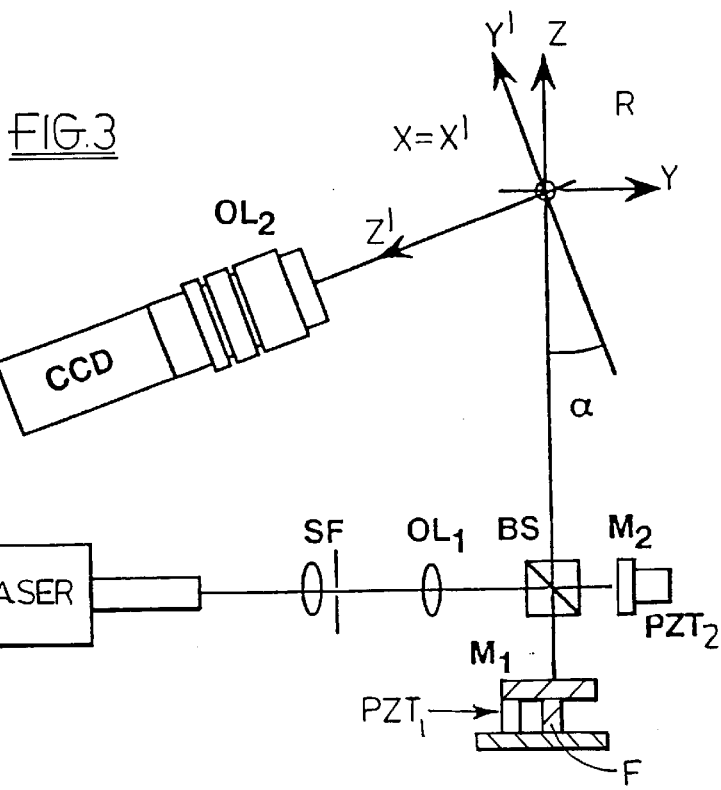
FIG. 3 is a diagrammatic illustration of a first measurement apparatus.

FIG. 3 illustrates one such way, using a Michelson interferometer arrangement. Coherent light from the laser is directed via spatial filter SF and objective lens $OL_1$ to a beamsplitter cube BS whence fringes are directed at the measurement region R. The fringes are imaged in a CCD camera via objective lens $OL_2$.

$M_1$ and $M_2$ are plane mirrors moved by piezo-electric translation devices $PZT_1$ and $PZT_2$. $M_2$ is juxtaposed to one face of the cube and moved towards and away therefrom by its PZT to alter the phase of the fringes at R. $M_1$ is juxtaposed to an adjacent, orthogonal face of the cube and tilted by its PZT about fulcrum F to alter the spatial frequency of the fringes.

In the method, $M_1$ is tilted to adjust the angle between the two beams in a number of steps, for example, 22 steps. For each angular step, four phase-stepped images are required. A phase change of $\pi/2$ is introduced between each of the successive four images by moving mirror $M_2$.

Using an 80 mW frequency—doubled diode-pumped YAG laser ($\lambda$=532 nm) with a 100 mm focal length for objective $OL_2$ at f/3.5, a speckle diameter of 3.5 $\mu$m is obtained. The active pixel area of the CCD camera is 5.8×7.4 $\mu$m² giving several speckles per pixel, which substantially reduces the effect of speckle noise.

Angle $\alpha$ (FIG. 3) was set to 20° for making the image of FIG. 1.

Figure 2:
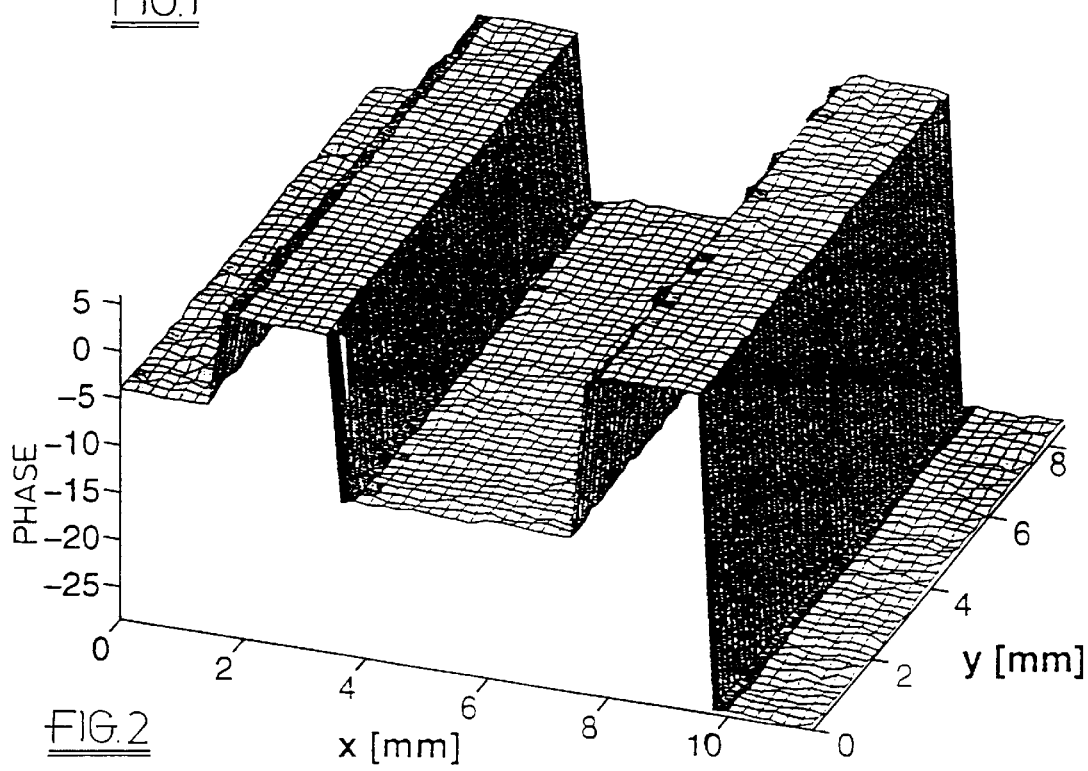
FIG. 2 is the result of unwrapping the phase map of FIG. 1 through a sequence of incremental phase maps.

The succession of images obtained is transferred to a fast computer for analysis. Incremental phase maps are determined using Equation 9 from Huntley and Saldner, loc cit (Equation (3) below). These are added by Equation 10 (Equation (1) below) to give the unwrapped phase map. After subtraction of a uniform phase ramp, the unwrapped phase map is as shown in FIG. 2. The surface profile has been measured accurately and unambiguously.

Figure 4:
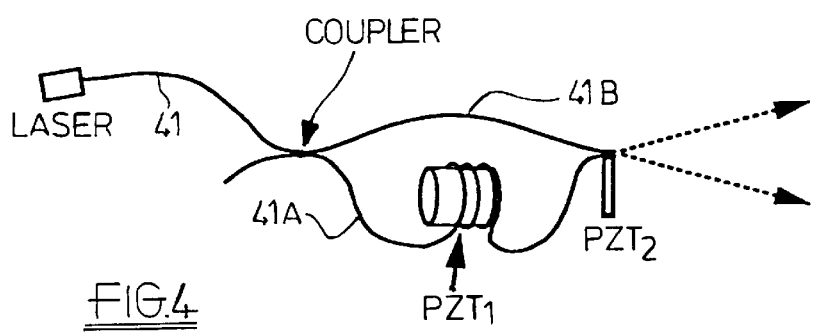
FIG. 4 is a diagrammatic illustration of a fringe generating means.

FIG. 4 shows an arrangement in which laser light is directed along a fibre 41 to a coupler so that coherent, in-phase light travels with equal amplitudes in fibres 41A, 41B to recombine at their ends to produce interference fringes. Fibre 41A is wrapped around a piezo-electric cylinder $PZT_1$ which expands and contracts radially according to an applied voltage, stretching fibre 41A to different extents, thereby shifting the relative phase of the recombining beams. The ends of the fibres 41A, 41B are relatively shifted in a direction perpendicular to the fibre axis by a second piezo-electric device $PZT_2$ which changes the fringe spacing.

Figure 5:
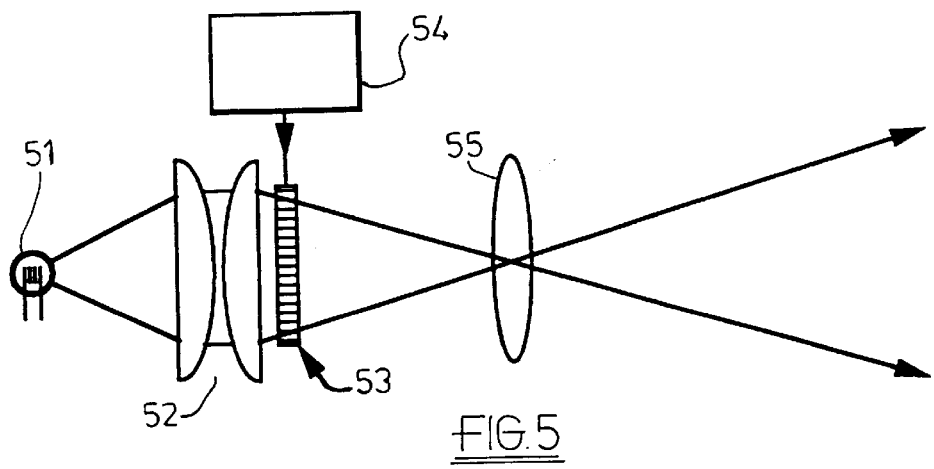
FIG. 5 is a diagrammatic illustration of another fringe generating means.

FIG. 5 shows an arrangement using white, incoherent light from a source 51 passing through a condenser 52 to a spatial light modulator 53 controlled by a signal generator 54 and a projection lens 55 to produce variable fringes.

The various embodiments of apparatus can be built into a comprehensive system with self-contained computing to produce various instruments adapted to make different kinds of measurement. The instruments will facilitate human body measurement for clothes manufacture and even bespoke tailoring, quality and process control on production lines, robot vision, medical and dental measurements. e.g. for prostheses, duplication of e.g. delicate artefacts, verification that a CAD/CAM product matches the design specification, reverse engineering and non-contact interfaces for virtual reality systems, among many other applications.

The calculation of the phase maps can be done in many different ways. Some use only three phase-stepped images, as compared to the four used in Huntley and Saldner, loc cit, but using five or more can lead to greater accuracy.

Various modifications of the above-described techniques are possible with advantages.

Instead, for example, of projecting a series of fringes in the sequence t=1, 2, 3, 4, 5, . . . s, (t being the number of fringes across the field of view) a sequence t=1, K, $K^2$, $K^3$, . . . s is projected where K is any number (not necessarily integral) greater than 1, for example, 2.

This results in an improvement in the success rate of the unwrapping procedure as well as a reduction in the time required for image acquisition and computation. With K=2 there is a good compromise between unwrapping reliability and computational cost.

Intermediate phase values can be incorporated into the calculations by linear least squares analysis to reduce the root-mean-square height error.

Figure 6:
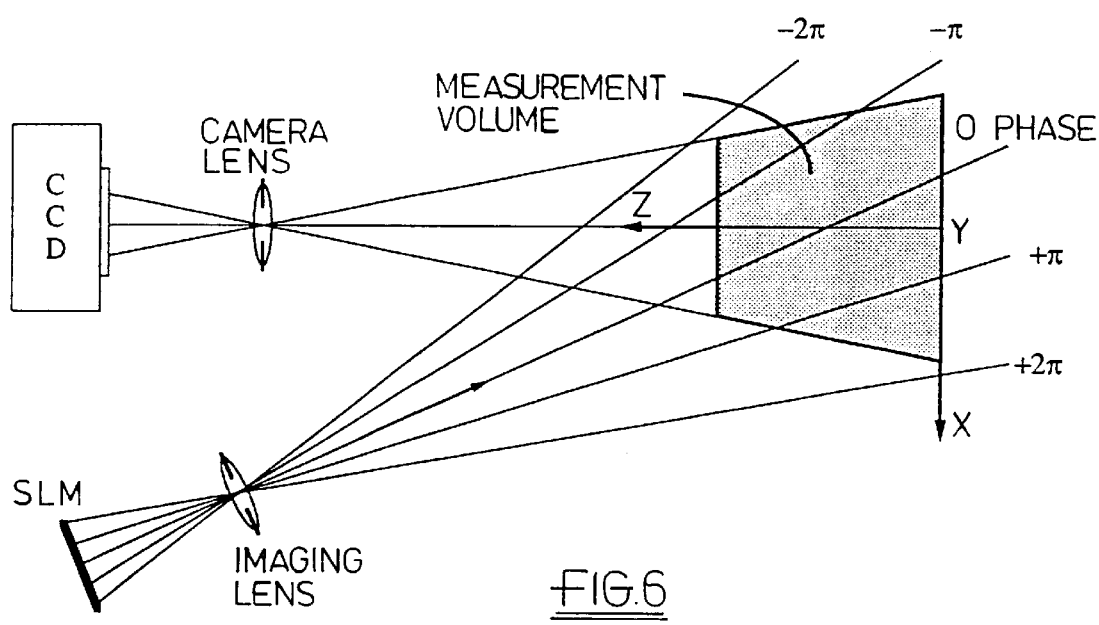
FIG. 6 is a diagrammatic illustration of a second measurement apparatus.

By way of illustration, and with reference to FIG. 6, the fringe pitch can be changed over time so that initially a single fringe is projected from the spatial light modulator SLM into a field of view region in the measurement volume so that the fringe phase ranges from $-\pi$ on one side to $+\pi$ on the other side. For subsequent time values (t=2, 3, ... s) the number of fringes is also set equal to t so that the phase range increases to $(-t\pi, t\pi)$. FIG. 6 shows the situation for the case t=2. For each t value a number of phase-stepped images is acquired (p=1, 2. ... q). The measured intensity. I is therefore a function of four variables: pixel coordinates (m, n) in the field of view, p and t.

FIG. 7 shows the I (p, t) map for three pixels with q=4 and phase steps of $\pi/2$. The first pixel (FIG. 7(a)) receives light from a point in the field of view where the phase of the projected fringes is increasing with time. FIG. 7(b) corresponds to a plane where the phase is not changing appreciably over time—in the middle of the projection field of view, for example, with the fringes coming from either side of it. FIG. 7(c) corresponds to a location on the opposite side where the phase is decreasing with time t.

The phase calculations for any point (m, n) involve computing the time-varying unwrapped phase by summing the wrapped phase changes between successive phase maps:

$$\Phi_u(t) = \sum_{t'=1}^{t} \Delta\Phi_w(t', t'-1) \tag{1}$$

where $$\Delta\Phi(i,j) = \Phi(i) - \Phi(j) \tag{2}$$

and $\Phi(0)$ is defined to be zero. Subscript w denotes a wrapped phased value (i.e. one lying in the range $(-\pi, \pi)$), and subscript u denotes an unwrapped phase value (i.e. adjusted by addition of the correct integral multiple of $2\pi$). The phase changes $\Delta\Phi_w(i,j)$ are calculated directly from the two sets of intensity values at times t=i and t=j using the formula:

$$\Delta\Phi_w(i,j) = \tan^{-1}\left[\frac{\Delta I_{42}(i)\Delta I_{13}(j) - \Delta I_{13}(i)\Delta I_{42}(j)}{\Delta I_{13}(i)\Delta I_{13}(j) + \Delta I_{42}(i)\Delta I_{42}(j)}\right] \tag{3}$$

where $$\Delta I_{k1}(t) = I(k,t) - I(l,t). \tag{4}$$

Figure 8:
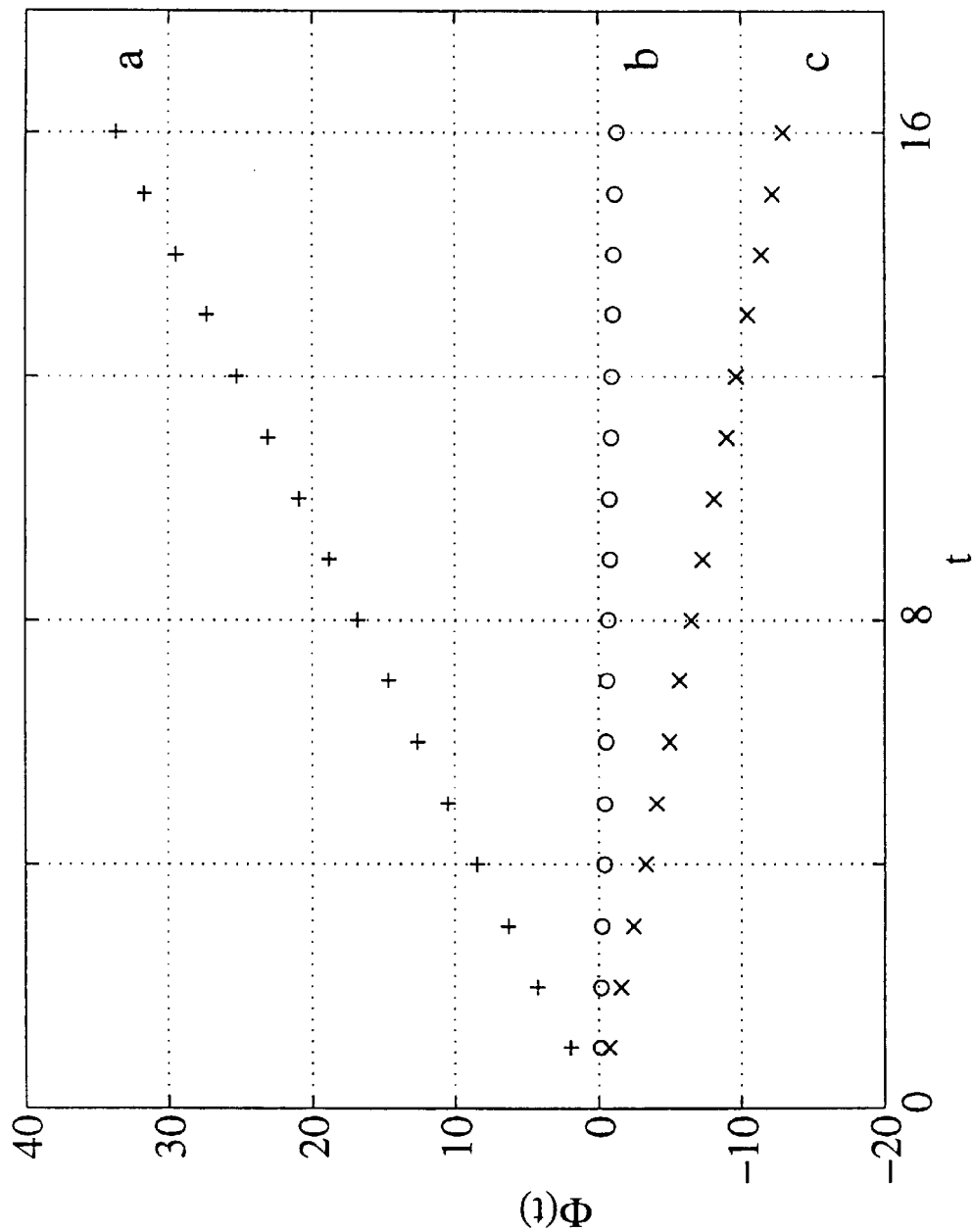
FIG. 8 shows the unwrapped time histories for the three pixels (a), (b), (c), of FIG. 7.

The total unwrapped phase, $\Psi$, given by $$\Psi = \Phi_u(S) \tag{5}$$

then defines the plane which contains the scattering point. FIG. 8 shows the unwrapped phase calculated in this way from the intensity data in FIGS. 7(a)–(c).

The unique coordinates in space of the scattering point within the measurement volume are then defined by the point of intersection between this plane and the line passing from the pixel (m, n) through the centre of the camera lens into the measurement volume. In practice, the surface of constant phase change may deviate from a plane due to imperfections in the fringe generating means. Similarly the line passing from the pixel (m, n) through the centre of the camera lens into the measurement volume may deviate from straightness due to imperfections in the recording means. Both of these errors may be corrected for by calibration of the apparatus.

The unwrapping can be carried out with fewer phase maps, and under most conditions more reliably, by taking only the phase values in the sequence t=1,2,4 ... s, corresponding to the case K=2. The general term in this sequence is $t=2^v$, where $v=0,1,2 \ldots \log_2 s$. The wrapped phase changes between successive frames are then unwrapped using the recursive equations $$\Delta\Phi_u(2t,t) = U\{\Delta\Phi_w(2t,t), \Delta\Phi_u(t,0)\} \tag{6}$$

$$\Delta\Phi_u(2t,0) = \Delta\Phi_u(2t,t) + \Delta\Phi_u(t,0). \tag{7}$$

for t=1,2,4, ... s/2, and starting from the phase value $\Delta\Phi_u(1,0) = \Phi_w(1)$. $U\{\Phi_1, \Phi_2\}$ represents the unwrapping operator which subtracts an integral multiple of $2\pi$ from $\Phi_1$ such that $\Phi_1 - \Phi_2$ lies in the range $-\pi$ to $+\pi$, i.e.

$$U\{\Phi_1, \Phi_2\} = \Phi_1 - 2\pi NINT\left[\frac{\Phi_1 - \Phi_2}{2\pi}\right] \tag{8}$$

where NINT denotes rounding to the nearest integer.

The measured phase values will in practice have errors associated with them. If the errors are additive and Gaussian, the measured linear sequence of unwrapped phase values can be written $$\Phi(t) = \omega t + \epsilon_\phi \tag{9}$$

where $\epsilon_\phi$ is a random variable with a zero-mean Gaussian probability distribution. $\omega$ is a non-dimensional frequency, representing the rate of change of phase with non-dimensional time t, i.e. the slope of the graphs shown in FIG. 8.

In the presence of noise, a better approach to the estimation of $\omega$ than simply using the final unwrapped phase value is a fitting in the least squares sense of the line defined by the equation $\Phi = \omega t$ to all the experimental data for the pixel analysed.

Least squares fitting does not significantly improve the estimate of $\omega$ when using an exponentially growing sequence of fringe frequencies. The reason for this is that the phase values used are all clustered around the low-t end of the $\Phi$-t graph. Low t values do not provide reliable estimates of the gradient, and so do not contribute significantly to the least-squares estimate for $\omega$. However, the algorithm can be modified by starting at the maximum fringe density (t=s), and reducing the number of fringes by 1,2,4,8 ... s2. This ensures that the measured phase values are now clustered at the high-t end of the $\Phi$-t graph. Equations (6) and (7) are modified to $$\Delta\Phi_u(s-t', s-2t') = U\{\Delta\Phi_w(s-t', s-2t'), \Delta\Phi_u(s, s-t')\} \tag{10}$$

$$\Delta\Phi_u(s, s-2t') = \Delta\Phi_w(s-t', s-2t') + \Delta\Phi_u(s, s-t'). \tag{11}$$

for t'=1,2,4, ... s/2, where the starting phase value $\Delta\Phi_u(s, s-1) = \Delta\Phi_w(s, s-1)$.

Both the unwrapping reliability and the computation time for this method are identical to those for the forward exponential sequence, yet the measurement accuracy is improved by a factor of approximately $\sqrt{\log_2 s}$. It is therefore recommended as the most appropriate algorithm when data acquisition and processing times must be minimised.

An alternative method of analysing the data which avoids the need for unwrapping is based on Fourier analysis of the 2-dimensional intensity distribution measured at each pixel. The 2-D transforms of the intensity distributions from the three pixels shown in FIG. 7 are presented in FIG. 9. The horizontal and vertical axes represent spatial frequencies $k_t$ and $k_p$ along the t (time) and p (phase-shift index) directions, respectively. The transform consists of three peaks: a dc term centred on $k_t=k_p=0$, and two sidelobes symmetrically oriented about the dc peak. If the phase-shifting algorithm used covers one complete cycle, then the sidelobes will always appear on the lines $k_p=\pm 1$. The position of the peak along the line $k_p=1$ is then proportional to the rate of change of phase as the fringes sweep past the pixel of interest, i.e. is proportional to $\omega$. FIG. 10 shows the cross section $k_p=1$ for the three transforms of FIG. 9.

In practical terms, the curves shown in FIG. 10 can be calculated directly by forming a 1-dimensional complex array $$h(t)=\Delta I_{13}(t)+i\Delta I_{42}(t) \tag{12}$$

where i is the square root of −1, and then taking a one-dimensional Fourier transform $$H(k_t) = \sum_{t'=0}^{s-1} h(t' + 1)\exp(-2\pi i k_t t' /s) \tag{13}$$

Computationally, the aim is to find the value $k_t=\kappa$ which maximises $|H(k_t)|^2$. This may be done as a two-step process: firstly, Equation (13) is evaluated for integral values of $k_t$ using the Fast Fourier Transform algorithm; the value $k_t$ which maximises $|H(k_t)|^2$ may then be used as the starting point for an optimisation based on a bounded Newton-Raphson algorithm, in which $k_t$ is no longer constrained to be integral. The random error from the method can be reduced further by noting that the signal peak, which is in general complex, can be made real by multiplying h(t) by $\exp(-2\pi i\kappa/s)$. A final iteration to maximise $\{Re[H(k_t)]\}^2$ then excludes noise contributed by the imaginary part of the transform.

Equation (12) can be generalised for use with phase-stepping algorithms other than the four-frame one (q=4) used here. All such algorithms result in two numbers : one proportional to $\cos(\Phi)$, which is used to form the real part of h(t), and the other one to $\sin(\Phi)$, which forms the imaginary part of h(t).

The computation time for this method is $o(s\log_2 s)$ which is a factor $\log_2 s$ longer than that for the linear fitting method. However, the Fourier transform method is interesting for two significant reasons; firstly the transform concentrates the signal with respect to the noise. The greater the value of s, the higher the signal to noise ratio in the vicinity of the peak. Thus the reliability is high and furthermore increases with increasing s, unlike the unwrapping methods for which the reliability decreases as s increases. Secondly, multiple reflections can occur if the object being profiled has a smooth surface. The light received at a given pixel then comes from two or more different points on the surface, having different values of $\omega$. For the phase unwrapping methods the result is a ripple on the $\Phi$-t graph which causes systematic errors in the gradient estimation, whereas the Fourier transform method will result in two or more peaks which do not interfere provided the frequencies are separated by at least $k_t=\pm 1$. Furthermore, the direct and indirect reflections could in principle be distinguished by making measurements of the object from different viewing or illumination directions and checking which of the peaks give consistent position measurements.

What is claimed is:

1. A method for measuring the shape of objects which might have surface discontinuities using projected fringes, in which method the pitch of the fringes is varied over time and a sequence of phase-stepped images is recorded from which a three-dimensional complex intensity distribution is calculated.

2. A method according to claim 1, in which the phase of the distribution is unwrapped along the time axis.

3. A method according to claim 1, in which the Fourier transform of the distribution is calculated along the time axis.

4. A method according to claim 1, in which the phase maps are recorded as pixel images.

5. A method according to claim 1, in which the pitch of the fringes is varied by piezo-electric device means.

6. A method according to claim 1, in which the fringes are produced by Michelson interferometer means.

7. A method according to claim 6, in which phase and spatial frequency of the fringes are varied by plane mirrors.

8. A method according to claim 1, in which the fringes are generated by interference between laser light traversing dissimilar paths of which at least one is variable for changing phase and spatial frequency.

9. A method according to claim 1, in which the fringes are generated from incoherent light by a spatial light modulator.

10. Apparatus for measuring the shape of objects which might have surface discontinuities using projected fringes comprising fringe generating means projecting fringes on the object to be measured, phase stepping means to vary the phase of the fringes and fringe pitch varying means adapted to vary the pitch of the generated fringes over time, recording means adapted to record a sequence of phase-stepped images and computing means programmed to calculate a three-dimensional complex intensity distribution.

11. Apparatus according to claim 10, in which the computing means are programmed to unwrap the phase of the distribution along the time axis.

12. Apparatus according to claim 10, in which the programming means are programmed to calculate the Fourier transform along the time axis of the distribution.

13. Apparatus according to claim 12, in which the fringe generating means comprise Michelson interferometer means.

14. Apparatus according to claim 13, in which the fringe phase and pitch varying means comprise plane mirror means.

15. Apparatus according to claim 14, in which the interferometer means comprise a beamsplitter cube with orthogonal adjacent faces and adjustable mirrors in juxtaposition to said adjacent faces.

16. Apparatus according to claim 15, in which one mirror is adjustable towards and away from its associated face and at least one of the mirrors is adjustable as to tilt.

17. Apparatus according to claim 15, in which at least one mirror is adjustable by means of a piezo-electric device.

18. Apparatus according to claim 10, in which the fringe generating means comprise laser illuminated optical fibre means providing two dissimilar light paths.

19. Apparatus according to claim 18, in which the phase varying means comprise optical fibre length varying means.

20. Apparatus according to claim 19, in which said length varying means comprise a piezo-electric cylinder around which the fibre is wrapped and which is electrically actuated to vary its diameter.

21. Apparatus according to claim 10, in which the fringes are generated from incoherent light by a spatial light modulator.

22. Apparatus according to claim 21, in which the fringe generating means comprise a white light source, a condenser lens system, a spatial light modulator and a projection lens projecting the fringes on to the object to be measured.

23. Apparatus according to claim 10, in which the recording means comprise a pixel image recorder such as a video system.

24. Apparatus according to claim 10, in which the computing means comprise a processor arranged to operate in real time by carrying out parallel simple arithmetic operations on an entire pixel image frame simultaneously.

* * * * *